Dec. 20, 1949 R. S. WEST 2,491,884
PIPE COUPLING DEVICE
Filed Oct. 28, 1946

INVENTOR
ROBERT S. WEST
By Young, Emery & Thompson
ATTYS

Patented Dec. 20, 1949

2,491,884

UNITED STATES PATENT OFFICE 2,491,884

PIPE COUPLING DEVICE

Robert S. West, Edinburgh, Scotland, assignor to James H. Lamont & Company Limited, Edinburgh, Scotland Application October 28, 1946, Serial No. 706,137
In Great Britain December 5, 1944

Section 1, Public Law 690, August 8, 1946
Patent expires December 5, 1964

8 Claims. (Cl. 285—122)

This invention is concerned with pipe coupling devices for the joints of metal pipes, and has reference to coupling devices in which an internally screw-threaded coupling nut has a ring revolubly retained therein to enable the coupling nut to be rotated when the ring is in contact with one of the elements of the joint.

Pipe joints may be broadly divided into two classes, viz: (1) those in which the pipe is of copper or other comparatively ductile metal and has its end flared outwards and is drawn over a tapered hollow plug or spigot, such joints being for brevity hereinafter termed "flared pipe joints," and (2) those in which a pipe of copper or other harder metal has a straight pipe end and the joint is made by means of a packing or sealing ring axially movable on the pipe. Such joints are for brevity hereinafter termed "straight pipe joints."

Previous suggested constructions of coupling devices in which a ring is revolubly retained in a coupling nut have been designed to suit one or the other of the two classes of joint and have not been applicable without modification to both classes of joint. For example, we have used such coupling devices for flared pipe joints, the ring being rotatably retained in a recess in front of an annular shoulder or flange at the back end of the coupling nut, the ring being internally conically tapered to fit the flared pipe end. For a straight pipe joint, it has been proposed to employ a coupling device in which the ring in the coupling nut includes a compressible or elastic ring or washer and a contractible portion in the form of a split collet adapted to bear directly on the pipe and having an outer conical surface adapted to co-operate with an internal conical surface formed on a sleeve part of the coupling nut by inward swaging of the said sleeve part after the compressible or elastic ring or washer and the split collet have been fitted in the coupling nut.

The present invention provides an improved construction of coupling device capable of use without modification both for flared pipe joints and straight pipe joints.

According to the invention the coupling device consists of an internally screw-threaded coupling nut having a rearwardly extending internally conically tapered sleeve integral with the nut, the taper in the sleeve converging rearwards from a recess of greater diameter than and behind the thread of the nut, and a bush or liner revolubly retained in the said sleeve and having conically formed internal and external surfaces. This bush or liner is preferably a solid or unsplit deformable metal ring and extends substantially the full length of the sleeve. The wider end of the interior of the sleeve may merge into the base of the recess at the back of the thread in the nut, in which case the external surface of the bush or liner preferably conforms to the internal shape of the sleeve. Alternatively, the wider end of the interior of the sleeve may terminate in an annular undercut groove, in which case the wider end of the bush or liner has an external projection or annular flange rotatably retained in the said groove.

The bush or liner is preferably rotatably retained in position by pressing or swaging the sleeve of the coupling nut inwards after the bush or liner has been inserted in the sleeve. For this purpose, the coupling nut may be provided with an initially cylindrical sleeve portion which is subsequently deformed by pressure or swaging until the sleeve portion assumes a truncated conical form.

In order that the invention may be more clearly understood, reference is hereinafter made to the accompanying drawings whereon:

Figure 1:
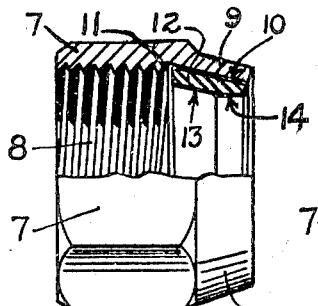
Figs. 1 and 2 are similar views illustrating alternative constructions of coupling devices according to the invention.

Referring to Fig. 1, the coupling device comprises a nut 7 having an internal screw-thread 8. The back of the nut is integral with a sleeve 9 which converges rearwards. The inside face 10 of the sleeve 9 is conically formed and its wider end is of greater diameter than the internal diameter of the thread 8, which thus forms a shoulder 11 at the back of the thread. This shoulder forms the front end of a conically formed recess defined by the internal face 10 of the sleeve, and in this recess a bush or liner 12 is rotatably retained. The bush or liner preferably conforms externally to the shape of the face 10 and the bush or liner is formed with a conically tapered internal surface 13, which may extend either throughout the length of the bush or only for part of its length, in which latter case the bush or liner may have a part of its internal surface cylindrical as shown at 14 in Fig. 1.

Figure 2:
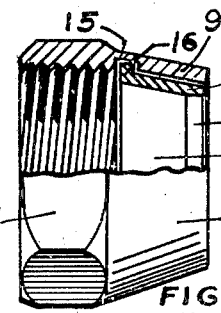

Fig. 2 illustrates a modification in which an undercut groove 15 is formed in the sleeve at the back of the thread, this groove revolubly receiving a projection or annular flange 16 on the bush or liner 12.

Figure 3:
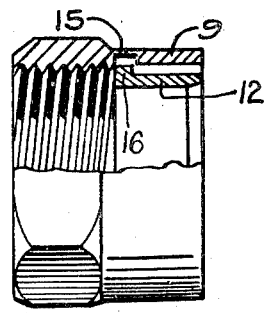
Fig. 3 illustrates the coupling device shown in Fig. 2 before the pressing or swaging operation.

The sleeve 9 may be initially formed to the shape shown in Figs. 1 and 2, in which case the bush or liner 12 may be expanded into position, but we prefer to first make the sleeve 9 cylindrical as shown in Fig. 3, and after the bush or liner 12 is inserted in the sleeve, the latter is subjected to a pressing or swaging operation to deform the sleeve inwards until it assumes the shape shown in Figs. 1 and 2 and revolubly retains the bush or liner against accidental displacement.

Figure 4:
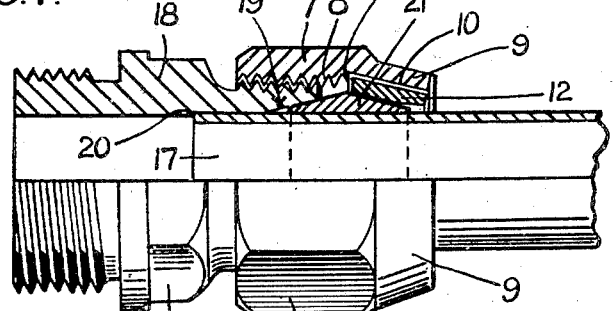
Fig. 4 illustrates a straight pipe joint employing the coupling device shown in Fig. 1.

Fig. 4 illustrates a straight pipe coupling wherein the straight pipe end 17 enters a socket in a coupling member 18 which is externally screw-threaded as shown to receive the coupling nut 7. The member 18 has a conically bored socket 19 terminating in a shoulder 20 against which the end of the pipe abuts. A hollow plug or spigot 21 tapered towards both ends is axially movable on the pipe and is compressed between the socket 19 and the bush or liner 12 when the coupling nut 7 is screwed upon the member 18.

Figure 5:
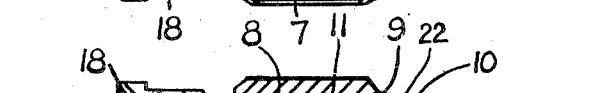
Fig. 5 illustrates a flared pipe joint employing the coupling device shown in Fig. 1.

Fig. 5 illustrates how the same coupling device shown in Figs. 1 and 4 may be used for a flared pipe joint, in which case the plug or spigot 21 fits inside the flared pipe end 22 and the bush or liner 12 engages the outside of the flared pipe end.

Obviously the coupling device shown in Fig. 2 could be substituted for that shown in Figs. 1, 4 and 5. The member 18 may be double-ended for joining two pipes together by means of two similar joints, or the member 18 may be an angle connection or bend, or a T-piece or other junction member.

Figure 6:
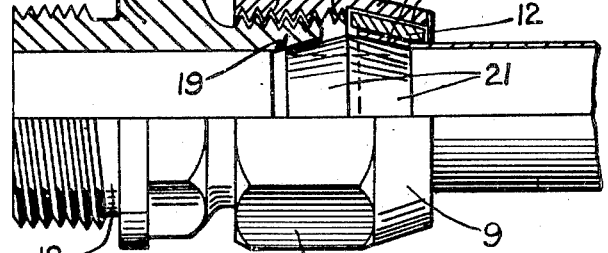
Fig. 6 illustrates a flared pipe joint for joining two flared pipe ends, employing the coupling device shown in Fig. 1.
Figure 6:
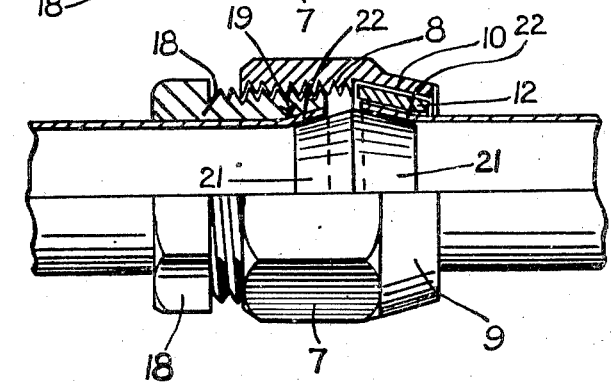

Fig. 6 shows how the coupling device can be employed for joining two flared pipe ends 22. In this case the hollow plug or spigot 21 is fitted between the flared ends of the two pipes and the outside faces of the flared ends of the pipes are engaged one by the bush or liner 12 and the other by the inside face of the socket 19 of the coupling member 18 which is bored to slide axially over one of the pipes.

It will be seen that the coupling devices shown in Figs. 1 and 2 can be used for both straight pipe joints and flared pipe joints, using a hollow plug or spigot 21 of suitable size either outside the pipe or inside the pipe end as the case may be.

I claim:

1. A pipe coupling device consisting of an internally screw-threaded coupling nut having a rearwardly extending internally conically tapered sleeve integral with the nut, the taper in said sleeve converging rearwards from a recess of greater diameter than and behind the thread in the nut, and a bush or liner revolubly retained in said sleeve, said bush or liner having rearwardly tapered conically formed internal and external surfaces and having at its wider end an external diameter greater than the internal diameter of said thread.

2. A pipe coupling device consisting of an internally screw-threaded coupling nut having a rearwardly extending internally conically tapered sleeve integral with the nut, the taper in said sleeve converging rearwards from a recess of greater diameter than and behind the thread in the nut, and a bush or liner revolubly retained in said sleeve, said bush or liner having rearwardly tapered conically formed internal and external surfaces and being formed as a solid or unsplit deformable metal ring having an external diameter at its wider end which is greater than the internal diameter of said thread.

3. A pipe coupling device consisting of an internally screw-threaded coupling nut having a rearwardly extending internally conically tapered sleeve integral with the nut, the taper in said sleeve converging rearwards from a recess of greater diameter than and behind the thread in the nut, and the wider end of the interior of said sleeve merging into the base of the recess at the back of the thread in the nut, and a bush or liner revolubly retained in said sleeve, said bush or liner having rearwardly tapered conically formed internal and external surfaces, and having an external surface which conforms in shape to the internal shape of the sleeve and which has a diameter at its wider end which is greater than the internal diameter of said thread.

4. A pipe coupling device consisting of an internally screw-threaded coupling nut having a rearwardly extending internally conically tapered sleeve integral with the nut, the taper in said sleeve converging rearwards from a recess of greater diameter than and behind the thread in the nut, and the wider end of the interior of said sleeve terminating in an annular undercut groove, and a bush or liner revolubly retained in said sleeve, said bush or liner having rearwardly tapered conically formed internal and external surfaces, and the wider end of said bush or liner having an external projection or annular flange of greater external diameter than the internal diameter of said thread and rotatably retained in said groove.

5. A pipe coupling device consisting of an internally screw-threaded coupling nut having a rearwardly extending internally conically tapered sleeve integral with the nut, the taper in said sleeve converging rearwards from a recess of greater diameter than and behind the thread in the nut, and an initially cylindrical bush or liner deformed to present rearwardly tapered conically formed internal and external surfaces, and said bush or liner being revolubly retained in position in said sleeve.

6. Pipe joint fittings for pipe joints comprising a coupling device according to claim 1 in combination with a hollow plug or spigot tapered towards both ends, and an externally screw-threaded coupling member adapted to co-operate with the thread in the nut.

7. A pipe joint fitting for a flared pipe joint comprising an internally screw-threaded coupling nut, an internally conically tapered sleeve integral with and extending rearwardly from said nut, the taper in said sleeve converging rearwards from a recess of greater diameter than and behind the thread in said nut, a conical liner rotatably retained in said sleeve, said liner having an external diameter at its wider end greater than the internal diameter of said thread, and conforming internally to the external surface of a flare on the end of a co-operating pipe, an externally screw-threaded hollow coupling member adapted to co-operate with the thread in said nut, and a hollow plug having an external surface tapered towards one end to enter the aforesaid flared pipe end, the other end of said plug being receivable within said coupling member.

8. A pipe joint fitting for a straight pipe joint comprising an internally screw-threaded coupling nut, an internally conically tapered sleeve integral with and extending rearwardly from said nut, the taper in said sleeve converging rearwards from a recess of greater diameter than and behind the thread in said nut, an externally screw-threaded hollow coupling member adapted to co-operate with the thread in said nut and adapted to receive the end of a straight pipe, a hollow plug adapted to slidably fit said pipe, one end of said plug being engageable with said coupling member and its other end being externally tapered, and a conical liner rotatably retained in said sleeve and having an external diameter at its wider end greater than the internal diameter of said thread, said liner conforming internally to the tapered end of said plug.

ROBERT S. WEST.

REFERENCES CITED

The following references are of record in the file of this patent:

UNITED STATES PATENTS

| Number | Name | Date |
|---|---|---|
| 1,920,512 | Lamont | Aug. 1, 1933 |
| 2,427,260 | Cowles | Sept. 9, 1947 |